UNITED STATES PATENT OFFICE.

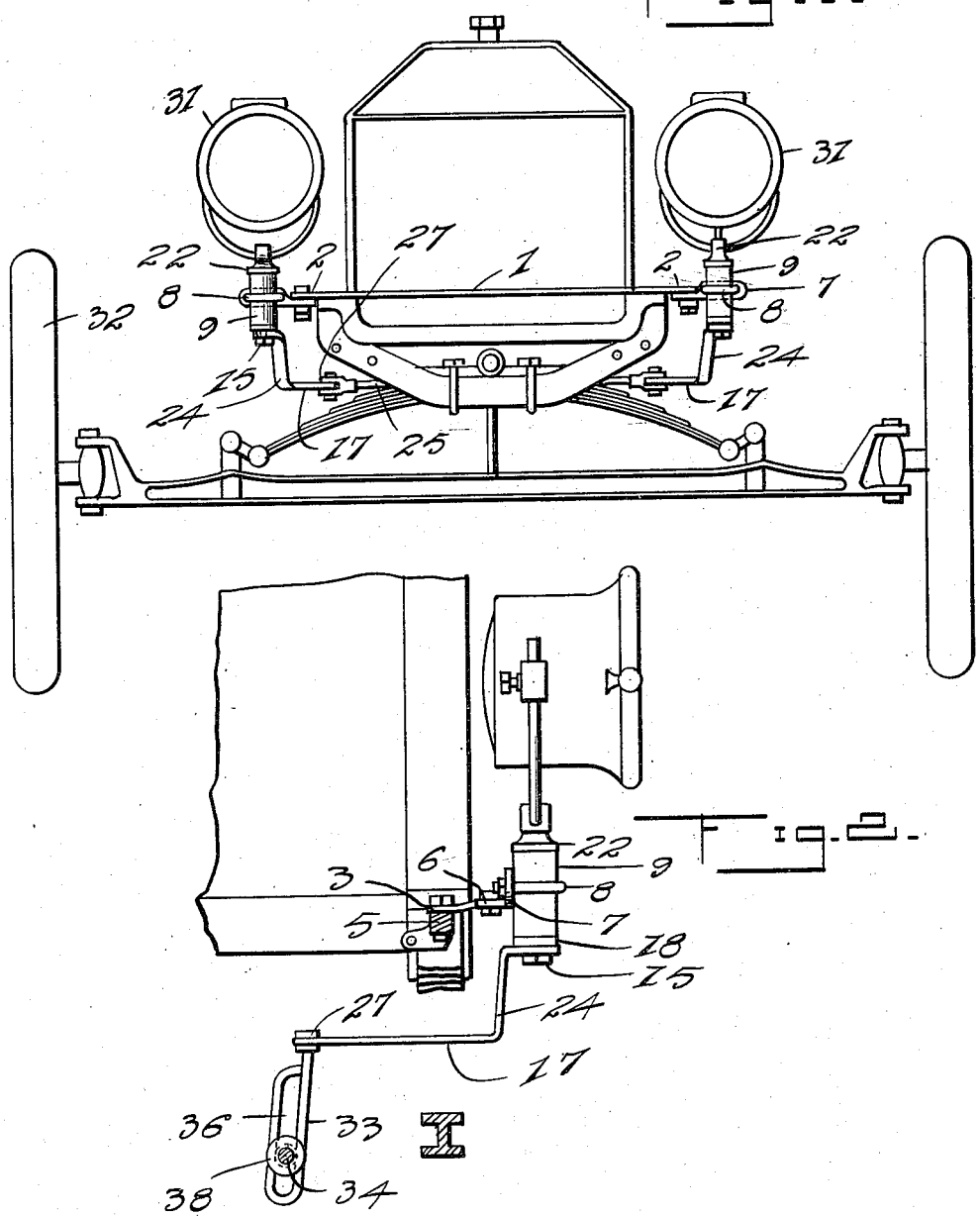

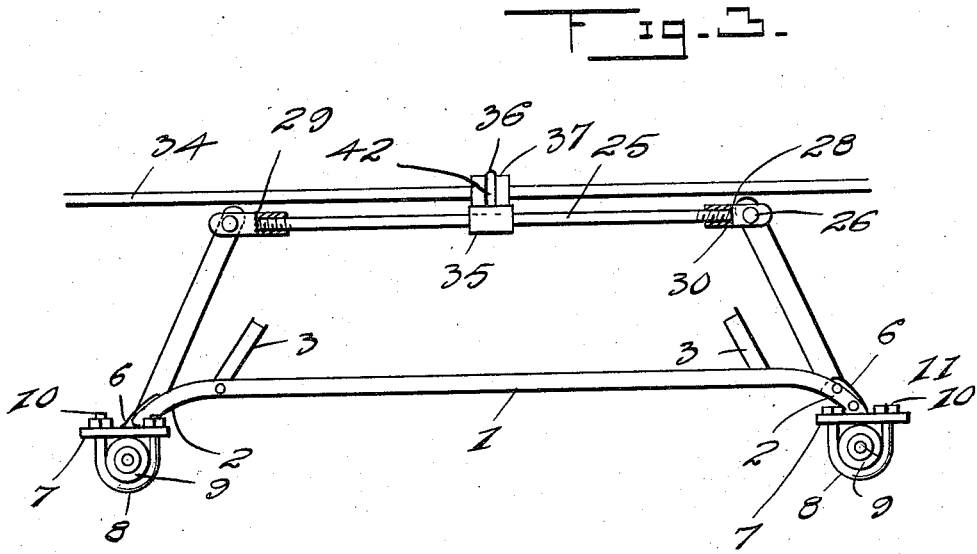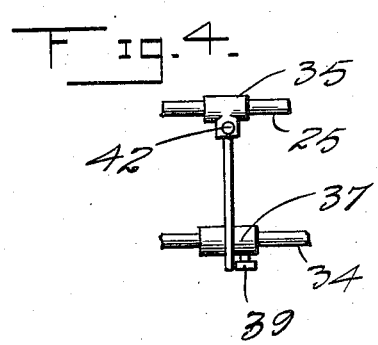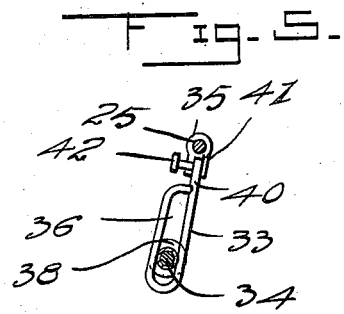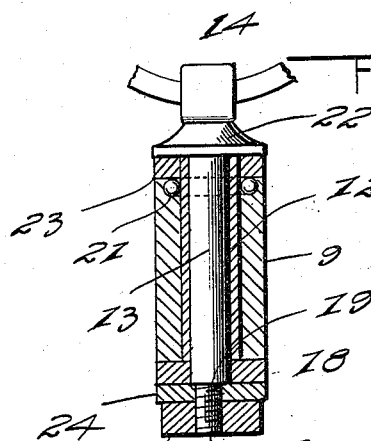

KINION C. BROOKS, OF ALEXANDRIA, LOUISIANA.

AUTOMATIC DIRIGIBLE HEADLIGHT FOR AUTOMOBILES.

1,173,925. Specification of Letters Patent. Patented Feb. 29, 1916.

Application filed November 3, 1915. Serial No. 59,399.

*To all whom it may concern:*

Be it known that I, KINION C. BROOKS, a citizen of the United States, residing at Alexandria, in the parish of Rapides and State of Louisiana, have invented certain new and useful Improvements in Automatic Dirigible Headlights for Automobiles; and I do hereby declare the following to be a full, clear, and exact description of the invention, such as will enable others skilled in the art to which it appertains to make and use the same.

The invention relates to improvements in dirigible headlights for automobiles.

The object of the present invention is to improve the construction of dirigible headlights for automobiles and to provide a simple, practical and comparatively inexpensive automatic dirigible headlight of strong and durable construction adapted to be readily applied to "Ford" automobiles and various other machines and capable of enabling the head light to be accurately controlled by the steering gear for turning the lights in the direction in which the front wheels are turned by the steering mechanism, whereby the light will be thrown in the direction in which the machine travels and will be changed according to the direction of the machine.

With these and other objects in view the invention consists in the construction and novel combination and arrangement of parts hereinafter fully described, illustrated in the accompanying drawings and pointed out in the claims hereto appended, it being understood that various changes in the form, proportion and minor details of construction may be resorted to without departing from the spirit and scope of the appended claims.

In the drawing Figure 1 is a front elevation of a Ford automobile provided with dirigible headlights constructed in accordance with this invention. Fig. 2 is a side elevation of the dirigible headlight, parts of the automobile being in section and parts being omitted. Fig. 3 is a plan view partly in section illustrating the construction for transmitting motion from the steering gear to the lamp bracket. Figs. 4 and 5 are detail views of the depending arm for connecting the dirigible headlight mechanism with the transverse rod of the steering mechanism. Fig. 6 is a detail sectional view illustrating the manner of mounting the lamp bracket.

Like numerals of reference designate corresponding parts in the several figures of the drawing.

In the accompanying drawings in which is illustrated the preferred embodiment of the invention, the dirigible headlight comprises in its construction, a supporting bracket composed of a transverse bar or member 1 extending across the front of a Ford machine or other automobile and provided with forwardly extending terminal portions 2 and having attaching arms 3 which are bolted to the machine at the opposite sides thereof preferably by bolts 4 of the fender braces 5, but the supporting bracket may be secured to a machine in any other desired manner. The diverging terminal portions 2 of the bar or member 1 support clamps 6 consisting of clip plates 7 and U-bolts 8, which embrace vertical bearings 9. The U-bolts 8 are equipped with nuts 10 and the clip plates which extend across the rear portions of the bearings 9 are provided with attaching shanks 11 which are bolted or otherwise secured to the diverging terminals 2 of the bar or member 1.

Each vertical bearing consists of a tubular member preferably provided with an inner sleeve or lining 12 and receiving the pivot 13 of the lamp bracket 14 which extends through the sleeve and projects below the same and has a lower threaded terminal 14$^a$. The lower terminals of the pivots 13 are threaded for the reception of nuts 15, washers 18 being preferably interposed between the arms and the lower ends of the bearings as clearly shown in Fig. 6 of the drawing. A reduced threaded portion 14$^a$ forms a shoulder 19 against which the arm 17 is clamped but any other suitable means may be employed for enabling the arm to be rigidly secured to the pivot 13. The bearing 9 is provided with an annular series of anti-friction balls 21 located at the top of the bearing beneath the head 22 of the lamp bracket, a washer 23, being interposed between the head 22 and the anti-friction balls.

The arms 17 which extend rearwardly are provided with drop bends 24 and they are pivotally connected at their rear end to an adjustable rod 25 by a bolt 26 or other suitable fastening devices. The rear ends of the arms are arranged in bifurcations 27 of sockets 28 which are right and left hand threaded to receive right and left hand threaded terminal portions 29 and 30 of the transverse connecting rod 25. By this construction an adjustable connection is provided to enable the lamps 31 to be adjusted in proper position with relation to the front wheels 32.

The transverse connecting rod 25 is connected by a depending arm 33 with the transverse rod 34 of the mechanism. The transverse rod 34 is connected with the steering knuckles of the front wheels so that when the front wheels are turned by the steering mechanism, the transverse rod 25 of a dirigible automatic headlight will be simultaneously moved in the same direction to cause the lights to turn laterally with the wheels when the direction in which the machine is traveling is changed. The depending arm 33 is provided at its upper end with a sleeve 35 to receive the transverse rod 25 and it has a slot or opening 36, which provides for the reception of a lower sleeve 37 having an annular groove 38 in which the sides of the slotted portion of the arm 33 are arranged. The slot 36 provides for the cushioning action of the springs of the vehicle so that the body in its upward and downward movement will not affect the operation of the dirigible headlight. The rod 34 of the steering mechanism passes through the sleeve 37 which is rigidly secured to the said rod 34 by a set screw 39. The set screw is adapted to be loosened to permit the rod 34 to slide through the sleeve without operating the dirigible headlight so that the lamp may remain stationary in a central position when desired. The arm 33 is provided with an upper terminal portion 40 which is secured in a depending tubular portion 41 of the upper sleeve 35 by a set screw 42.

It will be seen that the automatic dirigible headlight is exceedingly simple and inexpensive in construction, that is adapted to be readily applied to Ford automobiles and other machines and that is capable of causing the lamp to rotate horizontally with the lateral movement of the front wheels to move the light of the lamps in the direction in which the machine is traveling and to change the direction of the lamp with the change of the direction of the machine. It is also clear that the device may be readily arranged to permit the steering of the machine to be effected without turning the headlights.

What is claimed is:—

1. A dirigible headlight for automobiles including lamp brackets provided with depending pivots, means for mounting the lamp brackets at opposite sides of an automobile, arms secured to and extending rearwardly from the pivots, a transverse rod connecting the arms, said transverse rod being located above the plane of the transverse rod of the steering mechanism of the automobile, an arm depending from the transverse rod of the dirigible headlight and provided with a longitudinal slot, a sleeve mounted on the transverse rod of the steering gear and arranged in the slot of the said arm and having means for engaging the same at opposite sides thereof and means for securing the sleeve to the rod of the steering mechanism.

2. A dirigible headlight for automobiles including lamp brackets provided with depending pivots, means for mounting the lamp brackets at opposite sides of an automobile, arms secured to and extending rearwardly from the pivots, a transverse rod connecting the arms, said transverse rod being located above the plane of the transverse rod of the steering mechanism of the automobile, an arm depending from the transverse rod of the dirigible headlight and provided with a longitudinal slot, a sleeve mounted on the transverse rod of the steering gear and arranged in the slot of the arm and provided with a groove to receive the said arm, and a device for detachably securing the sleeve to the rod of the steering mechanism.

3. A dirigible headlight comprising a bracket consisting of a rod or member arranged to extend across the front of a machine and having forwardly diverging terminal portions and rearwardly extending attaching portions, clamps secured to the terminal portions of the bracket, bearings mounted in the clamps, lamp brackets having pivots arranged in the bearings and extending below the same, arms secured to the said pivots and extending rearwardly from the bearing, a transverse rod connecting the said arm, an arm depending from the transverse rod and connecting the same with the transverse rod of the steering mechanism of the machine.

In testimony whereof I affix my signature in presence of two witnesses.

KINION C. BROOKS.

Witnesses:
J. W. RUDISILL,
MIKE AARON.

Copies of this patent may be obtained for five cents each, by addressing the "Commissioner of Patents, Washington, D. C."